United States Patent [19]

Sayers

[11] 4,050,653

[45] Sept. 27, 1977

[54] BALLOON

[76] Inventor: Bernard Sayers, Sharp Lane, Newport, N.J. 08345

[21] Appl. No.: 666,889

[22] Filed: Mar. 15, 1976

[51] Int. Cl.$^2$ ............................................. B64B 1/40
[52] U.S. Cl. ...................................... 244/32; 244/25; 244/2; 244/139
[58] Field of Search ................... 244/25, 32, 127, 145, 244/DIG. 1, 30, 138 R, 139, 2

[56] References Cited

U.S. PATENT DOCUMENTS

| | | | |
|---|---|---|---|
| 1,188,849 | 6/1916 | Smith | 244/25 |
| 1,274,207 | 7/1918 | Sordyka | 244/32 |
| 1,811,196 | 6/1931 | Hazard | 244/25 |
| 3,310,261 | 3/1967 | Rogallo et al. | 244/DIG. 1 |
| 3,356,316 | 12/1967 | Forehand | 244/DIG. 1 |
| 3,450,377 | 6/1969 | Mitchell | 244/DIG. 1 |
| 3,724,789 | 4/1973 | Snyder | 244/145 |
| 3,980,259 | 9/1976 | Greenhalgh et al. | 244/139 |

*Primary Examiner*—Trygve M. Blix
*Assistant Examiner*—Galen L. Barefoot
*Attorney, Agent, or Firm*—Charles E. Baxley

[57] ABSTRACT

A balloon has an airfoil-shaped member connected to its top surface. The airfoil-shaped member has a top curved skin with a plurality of parallelly-spaced partitions which form therebetween a plurality of air passageways for air. Upon the descent or lateral movement of the balloon, the airfoil-shaped member is expanded to provide a vertical stabilization of the balloon and to afford better control of the balloon during the lateral travel thereof.

1 Claim, 4 Drawing Figures

BALLOON

BACKGROUND OF INVENTION

The present invention is directed to an improved balloon which is inflatable by hot air for subsequent ascent. In order to achieve greater stability of the descent of the balloon after ascent, an airfoil-shaped member is provided which is connected to the top surface of the balloon. By improving the stability of the balloon in its descent stage, the path of descent may be better planned and controlled along with a greater horizontal span of the path of travel.

SUMMARY OF INVENTION

It is the primary object of the present invention to provide a balloon with an airfoil-shaped member which increases the stability thereof while the balloon is in its descent stage.

The airfoil shaped member of the present invention has a top curved skin and a plurality of parallel ribs extending in the longitudinal direction of the skin which define therebetween a plurality of air passageways for the accumulation of air upon the descent of the balloon.

BRIEF DESCRIPTION OF DRAWING

The invention will be more readily understood with reference to the following detailed description when taken in conjunction with the accompanying drawings, wherein.

DETAILED DESCRIPTION OF INVENTION

Figure 1:
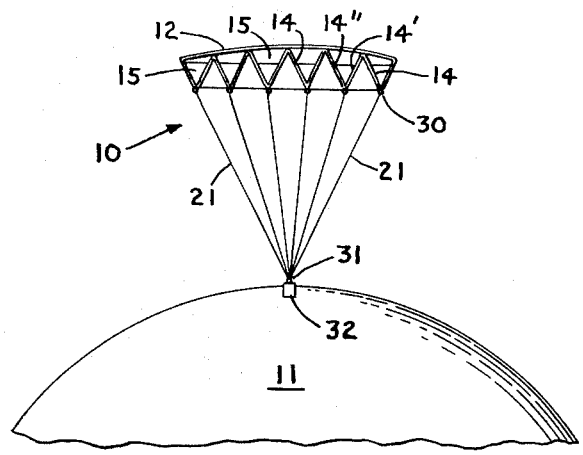
FIG. 1 is a front view showing the airfoil-shaped member attached to the top surface of a balloon of the present invention.

Referring now to the drawings, there is shown the airfoil-shaped member of the present invention, indicated generally by reference character 10. The airfoil-shaped member 10 is attached to the top curved surface of the main portion 11 of a balloon so that as the balloon enters its descent stage, better control and maneuvability thereof will be attained.

The airfoil-shaped member 10 is made up of a top curved skin 12 of any suitable material and when in its fully expanded condition defines a front downwardly extending mouth 13 through which the air flows. A plurality of partitions 14 are attached to the undersurface of the skin 12 and define therebetween a plurality of air passageways 15 through which air is forced upon the downward movement of the balloon and upon the lateral movement of the balloon. The partitions 14 are preferably made of the same material as the curved skin 12. In order to insure the integrity of the partitions 14 a plurality of reinforcing members 20 are provided, only one partition 14 being shown with the reinforcing members of FIG. 2. The reinforcing members 20 are preferably of triangular shape but may be of other configuration as long as the partitions 14 maintain their structural integrity during the descent and lateral movement of the main portion 11.

Figure 2:
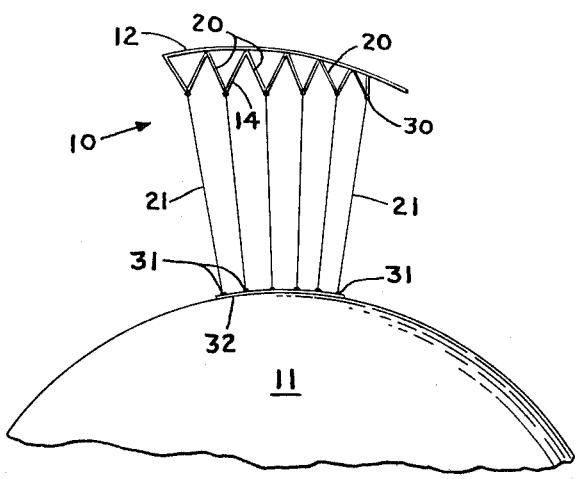
FIG. 2 is a side view showing the airfoil-shaped member attached to the balloon.
Figure 3:
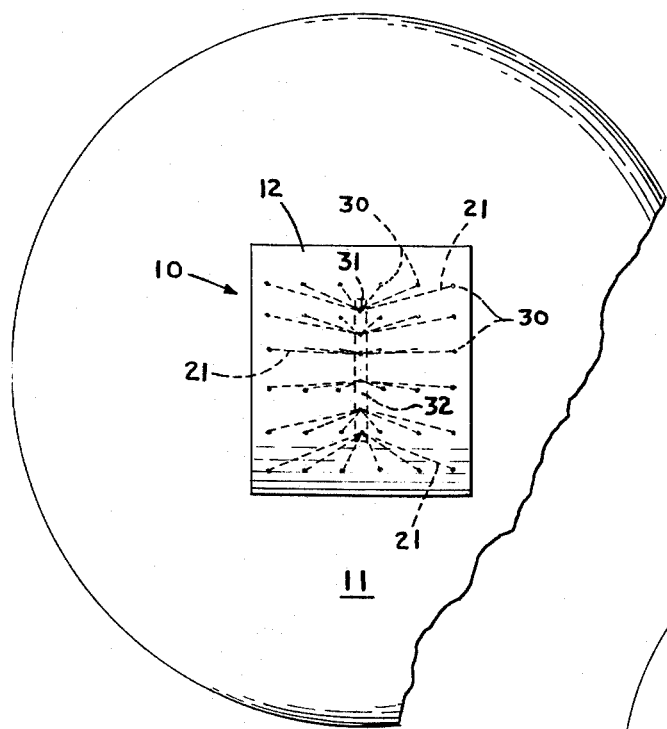
FIG. 3 is a plan view showing the airfoil-shaped member attached to the balloon.
Figure 4:
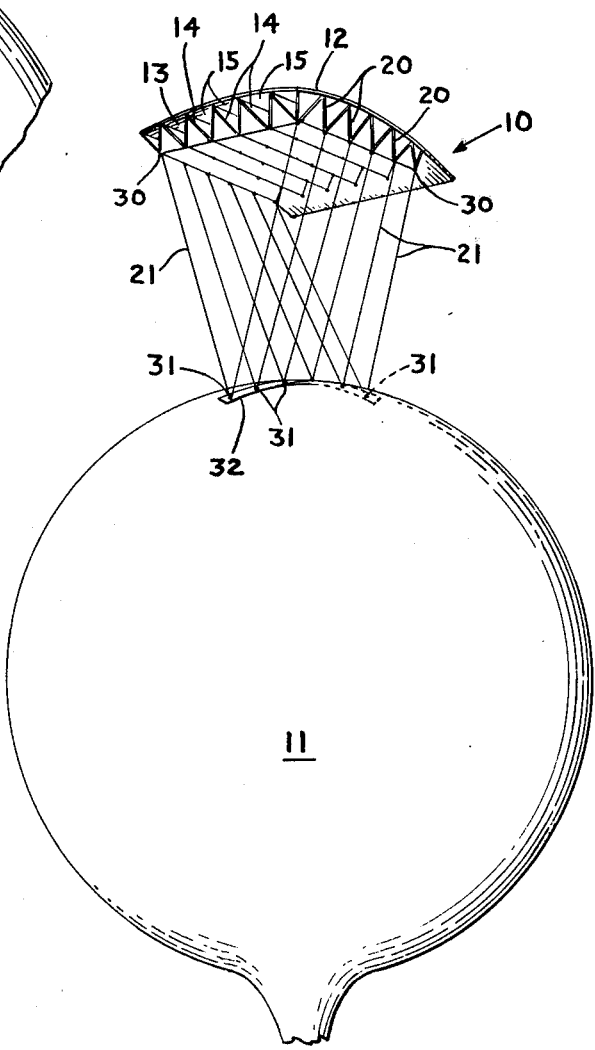
FIG. 4 is the perspective view showing the airfoil-shaped member attached to the balloon.

Each of the plurality of partitions 14 is formed by a first angular side member 14' and a second angular side member 14" which meet at a line spaced from the undersurface of the skin 12. The side members 14', 14" have, at their edges forming the suspension line, a plurality of spaced loops for the attachment of lines or strings 21. As can be seen in FIG. 2, six such lines are provided for the edges of the side members 14', 14", the six lines being spaced equally apart in the longitudinal direction taken from the mouth 13 of the airfoil-shaped member toward the other end of the airfoil-shaped member. Since, as shown in FIG. 2, six partitions 14 are provided, there are a total of thirty-six lines 21. Each line 21, which lies in the same plane as another line attached to a different side member, is attached to the top surface of the main portion 11 at the same point thereon. This can be seen in FIG. 3 where the strings extend from points 30 on the line of connection between the side members 14', 14" to the same point 31 on the top surface of the balloon, the top surface of the balloon being provided with a reinforcing plate 32 for receiving the ends of the lines 21.

In use, when the balloon 11 is in its descent stage or is travelling in a lateral direction, air is forced into the mouth 13 of the airfoil-shaped member 10, thereby causing the expansion of the curved skin 12 via the flow of air through the air passageways 15. The flow of air through the air passageways 15 creates an aerodynamic effect that helps to sustain the balloon is the air and to aid in the control of the balloon during its descent and lateral movement of travel. Further, since the airfoil-shaped member 10 is attached to the top surface of the balloon 11, stability of the balloon is increased since any forces on the balloon that tend to rotate it or disorient it are counteracted by the flow of air through the air passageways 15.

While a specific embodiment of the invention has been shown and described, it is to be understood that numerous changes and modifications may be had without departing from the scope and spirit of the invention. For example, more or less than six partitions may be provided depending upon the size of the balloon and the number of partitions deemed necessary to achieve better stability and control. Likewise, more or less than six strings or lines 21 may be provided as long as the stability and control of the balloon is assured. Further, the lines 21 in the same transverse plane need not be attached to the same point on the top surface of the balloon, but may instead by spaced from each other in equal increments so that a matrix of equally spaced points is formed. For example, in the embodiment shown in FIGS. 2, six rows of strings are provided along with six columns of the strings. The ends of these strings attached to the top surface of the balloon may be spaced in a matrix approximating the spacing of the ends of the strings affixed to the loops of the partitions 14 so that a six-by-six matrix is formed on the top surface of the balloon. This matrix of points of attachment would be of primary value when it is desired to spread out the forces acting on the top surface of the balloon over a wider area so that excessive stress is not placed on any particular portion of the balloon.

I claim:

1. An improved balloon comprising: a main portion for the containment therein of an inflating medium; and an airfoil-shaped member attached to the top surface of said main portion, said airfoil-shaped member comprising a curved skin having a mouth portion, a plurality of longitudinally extending partitions each having a first side member and a second side member, each first side member and each second side member having a first edge attached together to form a line of suspension and a second edge attached to the undersurface of said curved skin, said second edge of said first side member being spaced from said second edge of said second side member in a direction transverse to the longitudinal direction, each said line of suspension having a plurality of loops formed thereon, said plurality of loops of each line of suspension being spaced equally apart in the longitudinal direction, and a plurality of strings for said plurality of loops of each line of suspension, each string having a first end attached to one of said plurality of loops and a second end attached to said top surface of said main portion of said balloon, each of said plurality of partitions comprising a plurality of triangular-shaped reinforcements for each of its first and second side members, said second ends of those strings lying in the same transverse plane being attached to said top surface of said main portion of said balloon at the same point thereon and the points of attachment of said second ends forming a straight line, said top surface of said main portion of said balloon having a reinforcing plate thereon for the attachment of said second ends of said plurality of strings to said points.

* * * * *